United States Patent
Caldwell et al.

(10) Patent No.: US 12,252,120 B2
(45) Date of Patent: Mar. 18, 2025

(54) VEHICLE CONTROL SYSTEM AND METHOD

(71) Applicant: JAGUAR LAND ROVER LIMITED, Coventry (GB)

(72) Inventors: Robyn Caldwell, Coventry (GB); Denis Fusconi, Warwickshire (IT); Gareth Davies, Coventry (GB); Kieron Stanger, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 313 days.

(21) Appl. No.: 17/758,565

(22) PCT Filed: Jan. 10, 2021

(86) PCT No.: PCT/EP2021/050322
§ 371 (c)(1),
(2) Date: Jul. 8, 2022

(87) PCT Pub. No.: WO2021/140236
PCT Pub. Date: Jul. 15, 2021

(65) Prior Publication Data
US 2023/0037472 A1 Feb. 9, 2023

(30) Foreign Application Priority Data

Jan. 9, 2020 (GB) .................................... 2000257

(51) Int. Cl.
*B60W 30/12* (2020.01)
*B60W 40/109* (2012.01)
(Continued)

(52) U.S. Cl.
CPC .......... *B60W 30/12* (2013.01); *B60W 40/109* (2013.01); *G06V 20/58* (2022.01);
(Continued)

(58) Field of Classification Search
CPC ............... B60W 30/12; B60W 40/109; B60W 2552/53; B60W 2554/801; G06V 20/58; G06V 20/588
See application file for complete search history.

(56) References Cited

U.S. PATENT DOCUMENTS 8,965,633 B2 * 2/2015 Lee ........................ B62D 6/02
701/44
2009/0088966 A1 4/2009 Yokoyama et al.
(Continued)

FOREIGN PATENT DOCUMENTS

CN 109562787 A 4/2019
EP 2042962 A1 4/2009
(Continued)

OTHER PUBLICATIONS

Japan Patent Office, Office Action Issued in Application No. 2022-541971, Jul. 25, 2023, 9 pages.
(Continued)

*Primary Examiner* — Jacob M Amick
(74) *Attorney, Agent, or Firm* — McCoy Russell LLP

(57) ABSTRACT

A control system for controlling generation of a steering overlay signal to control a trajectory of a host vehicle can include one or more controllers and is configured to identify a lateral boundary of the host-vehicle lane of travel. The control system monitors a position of the host vehicle in relation to the lateral boundary of the host-vehicle lane of travel. A lateral velocity of the host vehicle is determined by the control system. The steering overlay signal is generated based on a determination that the host vehicle is approaching or traversing the lateral boundary of the host-vehicle lane of travel and that the determined lateral velocity is greater than
(Continued)

or equal to a first lateral velocity threshold. The control system can determine a lateral separation between the host vehicle and an object.

18 Claims, 7 Drawing Sheets

(51) Int. Cl.
  *G06V 20/56* (2022.01)
  *G06V 20/58* (2022.01)
(52) U.S. Cl.
  CPC ....... *G06V 20/588* (2022.01); *B60W 2552/53* (2020.02); *B60W 2554/801* (2020.02)

(56) References Cited

U.S. PATENT DOCUMENTS

| | | | |
|---|---|---|---|
| 2012/0166017 A1 | 6/2012 | Kobayashi et al. | |
| 2017/0101094 A1 | 4/2017 | Fiaschetti et al. | |
| 2018/0170430 A1 | 6/2018 | Shimizu | |
| 2018/0186405 A1 | 7/2018 | Nakahara | |
| 2018/0188735 A1* | 7/2018 | Sugawara | B60W 30/095 |
| 2018/0229770 A1 | 8/2018 | Kataoka et al. | |
| 2019/0168752 A1* | 6/2019 | Suzuki | B60W 30/12 |
| 2020/0156635 A1 | 5/2020 | Dallier et al. | |

FOREIGN PATENT DOCUMENTS

| | | |
|---|---|---|
| EP | 3495240 A1 | 6/2019 |
| JP | 2010030424 A | 2/2010 |
| JP | 2010036645 A | 2/2010 |
| JP | 2011148479 A | 8/2011 |
| JP | 2017013560 A | 1/2017 |
| WO | 2018224778 A1 | 12/2018 |

OTHER PUBLICATIONS

State Intellectual Property Office of the People's Republic of China, Office Action and Search Report Issued in Application No. 202180007981-0, Jun. 8, 2023, 16 pages. (Submitted with Partial Translation).

Great Britain Intellectual Property Office, Combined Search and Examination Report under Sections 17 and 18(3) Issued in Application No. GB2000257.2, May 22, 2020, 7 pages.

ISA European Patent Office, International Search Report Issued in Application No. PCT/EP2021/050322, Apr. 8, 2021, WIPO, 16 pages.

* cited by examiner

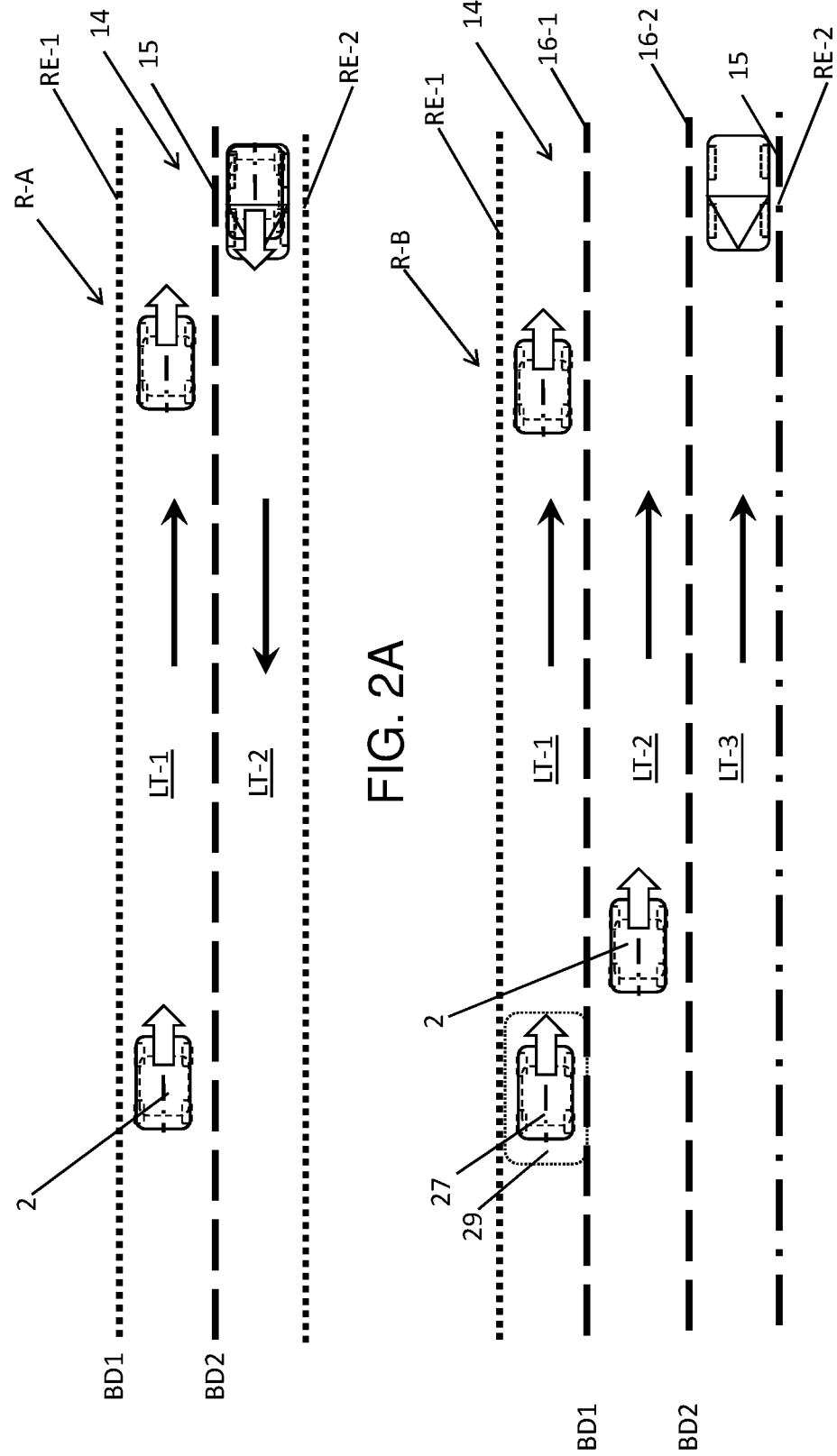

VEHICLE CONTROL SYSTEM AND METHOD

CROSS REFERENCE TO RELATED APPLICATIONS

The present application is a U.S. National Phase of International Application No. PCT/EP2021/050322 entitled "VEHICLE CONTROL SYSTEM AND METHOD," and filed on Jan. 10, 2021. International Application No. PCT/EP2021/050322 claims priority to Great Britain Patent Application No. 2000257.2 filed on Jan. 9, 2020. The entire contents of each of the above-listed applications are hereby incorporated by reference for all purposes.

TECHNICAL FIELD

The present disclosure relates to a vehicle control system and method. Aspects of the invention relate to a control system for controlling a trajectory of a host vehicle, a vehicle incorporating a control system, a method of controlling a trajectory of a host vehicle, a non-transitory computer-readable medium and computer software.

BACKGROUND

It is known to provide a road vehicle with a driver aid to assist with dynamic control of the vehicle. A host vehicle may be provided with a lane keep assist system to help maintain the host vehicle in a current lane of travel. The lane keep assist system identifies the boundaries of the lane of travel and, in use, generates a steering overlay upon determining that the host vehicle is in close proximity to a boundary of the lane of travel. The steering overlay is operative to steer the host vehicle away from the boundary. A similar control strategy may be implemented if another vehicle is identified in close proximity to the host vehicle. The other vehicle may be traveling in the same direction as the host vehicle, or in the opposite direction to the host vehicle. Known vehicle systems may result in an unexpected intervention, for example in a scenario where the host vehicle was in close proximity of a boundary of the lane of travel but the driver was not intending to change. In certain scenarios an unexpected intervention by the system may cause discomfort or alarm for the driver of the host vehicle.

It is an aim of the present invention to address one or more of the disadvantages associated with the prior art.

SUMMARY

Aspects and embodiments of the invention provide a control system, a vehicle, a method, a non-transitory computer-readable medium and computer software.

According to a further aspect of the present invention there is provided a control system for controlling generation of a steering overlay signal to control a trajectory of a host vehicle, the control system comprising one or more controllers, the control system configured to: identify a lateral boundary of the host-vehicle lane of travel; monitor a position of the host vehicle in relation to the lateral boundary of the host-vehicle lane of travel; and determine a lateral velocity of the host vehicle. The steering overlay signal may control generation of a steering torque which may be applied to the steering wheel of the host vehicle, for example by a power assist steering system. The control system may be configured to control generation of the steering overlay signal in dependence on the lateral velocity of the vehicle.

The control system may be configured to generate the steering overlay signal in dependence on a determination that the host vehicle is approaching or traversing the lateral boundary of the host-vehicle lane of travel and that the determined lateral velocity is greater than or equal to a first lateral velocity threshold. By referencing the lateral velocity of the vehicle, the steering overlay signal may be controlled to reduce or prevent unnecessary or unexpected application of a steering torque. At least in certain embodiments, false activation of the control system may be reduced or avoided by taking account of the dynamic operation of the host vehicle.

The control system may be configured to determine a lateral separation between the host vehicle and the lateral boundary of the host-vehicle lane of travel. The steering overlay signal may be generated when the determined lateral separation is less than or equal to a separation threshold. The lateral boundary may comprise one or more of the following: a lane marking; a centre marking; a road edge, such as a physical limit or boundary of the road; a central divide; a barrier (temporary or permanent); a guard rail; and one or more obstacle, such as a row of parked cars. It will be understood that this list is non-exhaustive.

The control system may be configured to monitor a position and/or a trajectory of the host vehicle within the host-vehicle lane of travel. The control system may be configured to predict a lateral separation between the host vehicle and the lateral boundary of the host-vehicle lane of travel in dependence on the position and/or the trajectory of the host vehicle within the host-vehicle lane of travel. The control may generate the steering overlay signal in dependence on a determination that the predicted lateral separation is less than or equal to the separation threshold.

The control system may be configured to identify the presence or absence of another vehicle proximal to the host vehicle. The steering overlay signal may be generated in dependence on identification of the presence of the other vehicle. The steering overlay signal may be output if the other vehicle is detected. The steering overlay signal may be inhibited if no other vehicle is detected. The control system may identify the presence or absence of the other vehicle within a predefined area or region relative to the host vehicle. The predefined area or region may, for example, correspond to a driver blind spot. The presence or absence of the other vehicle may be determined by a blind spot assist system. The blind spot assist system may be configured to monitor a blind spot detection area to identify the presence or absence of the other vehicle. If the blind spot assist system detects the presence of another vehicle, the control system may control generation of the steering overlay signal in dependence on the analysis of the lateral velocity of the host vehicle.

According to a further aspect of the present invention there is provided a control system for controlling generation of a steering overlay signal to control a trajectory of a host vehicle, the control system comprising one or more controllers, the control system configured to: identify an object external to the host vehicle; determine a lateral separation between the host vehicle and the identified object; and determine a lateral velocity of the host vehicle. The control system may be configured to generate the steering overlay signal in dependence on a determination that the lateral separation is less than or equal to a separation threshold and that the determined lateral velocity is greater than or equal to a first lateral velocity threshold. The control system may monitor a position of the host vehicle to determine the lateral separation.

The control system may be configured to monitor a position and/or a trajectory of the host vehicle within the host-vehicle lane of travel. The control system may be configured to predict a lateral separation between the host vehicle and the identified object in dependence on the position and/or the trajectory of the host vehicle within the host-vehicle lane of travel. The steering overlay signal may be generated in dependence on a determination that the predicted lateral separation is less than or equal to the separation threshold.

The identified object may comprise another vehicle. The other vehicle may be traveling in the same direction as the host vehicle; or may be traveling in the opposite direction to the host vehicle. The control system may be configured to monitor a position and/or a trajectory of the other vehicle. The control system may be configured to predict the lateral separation between the host vehicle and the other vehicle in dependence on a predicted position and/or trajectory of the other vehicle. The identified object could comprise a cyclist or a pedestrian.

The steering overlay signal may be configured to control the trajectory of the host vehicle to maintain or increase the lateral separation.

The control system may be configured to suppress generation of the steering overlay signal when the determined lateral velocity is less than the first lateral velocity threshold. The first lateral velocity threshold may be approximately 0.1 m/s.

The control system may be configured to suppress generation of the steering overlay signal when the determined lateral velocity is greater than a second lateral velocity threshold. The upper lateral velocity threshold may be approximately 0.7 m/s. The control system may be configured to apply a lateral velocity hysteresis. The lateral velocity hysteresis may be approximately 0.05 m/s.

According to a further aspect of the present invention there is provided a vehicle comprising a control system as described herein.

According to a further aspect of the present invention there is provided a method of controlling a trajectory of a host vehicle, the method comprising: identifying a lateral boundary of the host-vehicle lane of travel; monitoring a position of the host vehicle in relation to the lateral boundary of the host-vehicle lane of travel; and determining a lateral velocity of the host vehicle. The method may comprise controlling the trajectory of the host vehicle in dependence on the determined lateral velocity of the host vehicle. The method may comprise controlling the trajectory of the host vehicle in dependence on a determination that the host vehicle is approaching or traversing the lateral boundary of the host-vehicle lane of travel and that the determined lateral velocity is greater than or equal to a first lateral velocity threshold. The trajectory of the host vehicle may, for example, be controlled by generating a steering overlay signal. The steering overlay signal may, for example, control application of a steering overlay torque.

The method may comprise determining a lateral separation between the host vehicle and the lateral boundary of the host-vehicle lane of travel. The method may comprise controlling the trajectory of the host vehicle when the determined lateral separation is less than or equal to a separation threshold.

The method may comprise monitoring a position and/or a trajectory of the host vehicle within the host-vehicle lane of travel. The method may comprise predicting a lateral separation between the host vehicle and the lateral boundary of the host-vehicle lane of travel in dependence on the position and/or the trajectory of the host vehicle within the host-vehicle lane of travel. The method may comprise controlling the trajectory of the host vehicle in dependence on a determination that the predicted lateral separation will be less than or equal to the separation threshold (for example within a predefined time period).

The method may comprise identifying the presence or absence of another vehicle proximal to the host vehicle. The method may comprise controlling the trajectory of the host vehicle in dependence on identification of the presence of the other vehicle. The trajectory of the host vehicle may be controlled only if the other vehicle is detected. The trajectory of the host vehicle may not be controlled if no other vehicle is detected. The method may comprise identifying the presence or absence of the other vehicle within a predefined area or region relative to the host vehicle. The predefined area or region may, for example, correspond to a driver blind spot. The method may comprise monitoring a blind spot detection area to identify the presence or absence of the other vehicle. If the presence of another vehicle is detected, the method may comprise controlling the trajectory of the host vehicle in dependence on the analysis of the lateral velocity of the host vehicle.

According to a further aspect of the present invention there is provided a method of controlling a trajectory of a host vehicle, the method comprising: identifying an object external to the host vehicle; determining a lateral separation between the host vehicle and the identified object; and determining a lateral velocity of the host vehicle. The method may comprise controlling the trajectory of the host vehicle in dependence on a determination that the lateral separation is less than or equal to a separation threshold and that the determined lateral velocity is greater than or equal to a first lateral velocity threshold. The trajectory of the host vehicle may, for example, be controlled by generating a steering overlay signal. The steering overlay signal may, for example, control application of a steering overlay torque. The method may comprise monitoring a position of the host vehicle. The lateral separation between the host vehicle and the identified object may be determined in dependence on the determined position of the host vehicle.

The method may comprise monitoring a position and/or a trajectory of the host vehicle within the host-vehicle lane of travel. The method may comprise predicting a lateral separation between the host vehicle and the identified object in dependence on the position and/or the trajectory of the host vehicle within the host-vehicle lane of travel. The method may comprise controlling the trajectory of the host vehicle in dependence on a determination that the predicted lateral separation will be less than or equal to the separation threshold (for example within a predefined time period).

The identified object may comprise another vehicle.

The method may comprise controlling the trajectory of the host vehicle to maintain or increase the lateral separation.

The method may comprise suppressing control of the trajectory of the host vehicle generation when the determined lateral velocity is less than the first lateral velocity threshold. It will be understood that the driver of the host vehicle still able to control the host vehicle. References to suppressing control of the trajectory of the host vehicle relate to the automated or semi-automated control of the trajectory of the host vehicle, for example by a lane keep assist system or the like. The method may, for example, comprise suppressing generation of a steering overlay signal.

The first lateral velocity threshold may be approximately 0.1 m/s.

The method may comprise suppressing control of the trajectory of the host vehicle when the determined lateral velocity is greater than a second lateral velocity threshold, the second lateral velocity threshold may optionally be approximately 0.7 m/s. It will be understood that the driver of the host vehicle still able to control the host vehicle. References to suppressing control of the trajectory of the host vehicle relate to the automated or semi-automated control of the trajectory of the host vehicle, for example by a lane keep assist system or the like. The method may, for example, comprise suppressing generation of a steering overlay signal.

The method may comprise applying a lateral velocity hysteresis. The lateral velocity hysteresis may be approximately 0.05 m/s.

According to a further aspect of the present invention there is provided a non-transitory computer-readable medium having a set of instructions stored therein which, when executed, cause a processor to perform the method described herein.

According to a further aspect of the present invention there is provided a computer software that, when executed, is arranged to perform a method as described herein.

Within the scope of this application it is expressly intended that the various aspects, embodiments, examples and alternatives set out in the preceding paragraphs, the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 2A illustrates the host vehicle traveling in a lane of travel on a first section of road;

FIG. 2B illustrates the host vehicle traveling in a lane of travel on a second section of road;

DETAILED DESCRIPTION

A control system 1 in accordance with an embodiment of the present invention will now be described with reference to the accompanying figures. The control system 1 is installed in a vehicle 2, referred to herein as the host vehicle 2. The host vehicle 2 in the present embodiment is an automobile, but it will be understood that the controller 1 may be used in other types of land vehicle. The host vehicle 2 is described herein with reference to a reference frame comprising a longitudinal axis X, a transverse axis Y and a vertical axis Z. The host vehicle 2 has a longitudinal centreline CL extending along the longitudinal axis X.

Figure 1:
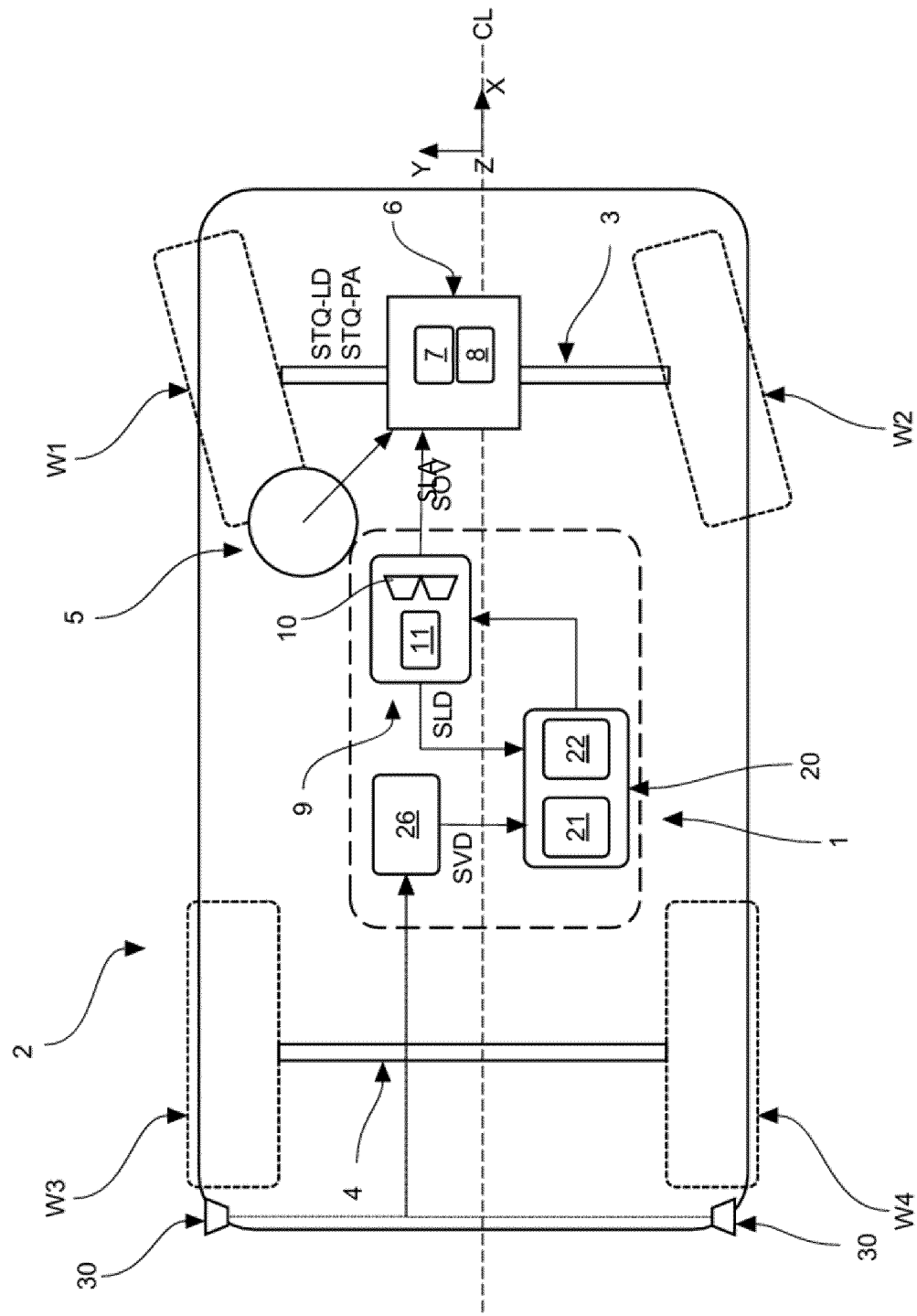
FIG. 1 shows a schematic representation of a host vehicle incorporating a control system in accordance with an embodiment of the present invention.

As illustrated in FIG. 1, the host vehicle 2 comprises four (4) wheels W1-4. The wheels W1-4 are provided on front and rear axles 3, 4. As illustrated in FIG. 1, the first and second wheels W1, W2 provided on the front axle 3 are steerable to control a direction of travel of the host vehicle 2. A driver-operated steering wheel 5 is provided for controlling a steering angle α of the first and second wheels W1, W2 provided on the front axle 3. A power assist steering system 6 is provided to generate a steering assist torque STQ-PA to supplement a steering torque STQ-D applied to the steering wheel 5 by the driver. The control system 1 is configured to generate a steering overlay signal SOV for controlling generation of a steering overlay by the power assist steering system 6. The steering overlay in the present embodiment comprises a steering torque overlay which supplements the steering assist torque STQ-PA and, at least in certain embodiments, is effective in controlling a trajectory of the host vehicle 2. The power assist steering system 6 comprises a power assist steering controller 7; a torque sensor (not shown) for sensing the steering torque applied by the driver to the steering wheel 5; and a power assist steering actuator 8 for generating the steering assist torque STQ-PA. In the present embodiment, the power assist steering system 6 is an electric power assist steering system (EPAS) comprising an electromechanical actuator operable to generate the steering assist torque STQ-PA. Other types of power assist steering actuator 7 may be used, such as a hydraulic actuator.

The host vehicle 2 is described herein with reference to a road R comprising one or more lanes of travel LT-n. The lane of travel LT-n within which the host vehicle 2 is traveling is referred to herein as the host-vehicle lane of travel LT-n. The control system 1 comprises a lane departure warning system 9 for identifying that the host vehicle 2 is departing the host-vehicle lane of travel LT-n, or predicting that the host vehicle 2 is likely to depart the host-vehicle lane of travel LT-n. The lane departure warning system 9 comprises a sensor unit 10 and an image processing module 11. The sensor unit 10 in the present embodiment comprises an optical camera having a field of view extending forwards in front of the host vehicle 2. The sensor unit 10 may comprise one or more optical cameras, for example a stereo camera. Alternatively, or in addition, the lane departure warning system 9 may utilize other types of sensor, such as a radar system or a LIDAR system, to capture an image of a region in front of the host vehicle 2. The sensor unit 10 in the present embodiment is located behind a rear-view mirror (not shown) provided at the top of the front windshield. Other mounting locations are possible, for example the sensor unit 10 may be provided behind or in a front grille of the host vehicle 2. The lane departure warning system 9 may optionally receive inputs from one or more vehicle systems, for example to determine if the driver has activated side indicators to signal an intended change the lane of travel LT-n.

The lane departure warning system 9 is configured to identify one or more lateral boundaries of the host-vehicle lane of travel LT-n. In the present embodiment, the lane departure warning system 9 is configured to identify first and second lateral boundaries of the host-vehicle lane of travel LT-n. As described herein, a lateral boundary BD-n of the host-vehicle lane of travel LT-n may comprise or consist of one or more lane markings, for example comprising or consisting of a continuous or interrupted line. Alternatively, or in addition, a lateral boundary BD-n of the host-vehicle lane of travel LT-n may comprise or consist of a physical edge or limit of the road R. The physical edge or limit of the road R is referred to herein as a road edge RE. The host-vehicle lane of travel LT-n typically comprises first and second lateral boundaries corresponding to opposing sides of the lane of travel LT-n. Each of the first and second lateral boundaries may be defined by one or more of the following: a lane marking (continuous or interrupted); a central road marking (continuous or interrupted); a barrier, such as a central divide; and a road edge RE. The lane departure warning system 9 is configured to identify at least one of the first and second lateral boundaries of the host-vehicle lane of travel LT-n. The lane departure warning system 9 is configured to determine that the host vehicle 2 is departing the host-vehicle lane of travel LT-n by identifying when the host vehicle 2 is approaching or traversing one of the lateral boundaries of the host-vehicle lane of travel LT-n.

The image processing module 11 receives image data captured by the sensor unit 10. The lane departure warning system 9 is configured to process the image data captured by the sensor unit 10 at least substantially in real time. The image data is processed to identify features of the road R on which the host vehicle 2 is traveling. The image processing module 11 processes the image data to identify at least one of the first and second lateral boundaries of the host-vehicle lane of travel LT-n. The image processing module 11 can process the image data to identify lane markings on the road R. The image processing module 11 may, for example, utilize image processing techniques to identify continuous or interrupted lines extending in a forward direction (i.e. parallel to the centre line CL of the host vehicle 2). The image processing module 11 is configured to identify central road markings 15 and/or lane markings 16-n. The image processing module 11 can identify the road edge RE, for example by identifying a transition or boundary between a road surface which may be relatively smooth (for example defined by asphalt, concrete or other surfacing material) and an adjacent surface which may be relatively rough (for example composed of one or more of the following: grass, mud, gravel, sand and snow). Alternatively, or in addition, the image processing module 11 may identify changes in the contrast and/or the colour of the image data which may be indicative of a lateral boundary BD-n. Other image processing techniques may be used to identify the or each lateral boundary BD-n. The image processing module 11 thereby identifies the lane of travel LT-n in which the host vehicle 2 is currently traveling.

The lane departure warning system 9 identifies the lateral boundary BD-n closest to the longitudinal centreline CL of the host vehicle 2 and determines a lateral separation DLAT between the identified lateral boundary BD-n and a proximal side of the host vehicle 2 (i.e. the side of the host vehicle 2 closest to the identified boundary). The lateral separation DLAT may be measured along the transverse axis Y of the host vehicle 2. Alternatively, the lateral separation DLAT may be measured in a direction substantially orthogonal to the lateral boundary BD-n of the host-vehicle lane of travel LT-n. The lane departure warning system 9 compares the determined lateral separation DLAT to a predefined first separation threshold THD. The lane departure warning system 9 may determine that the host vehicle 2 is departing the host-vehicle lane of travel LT-n if the determined lateral separation DLAT is less than the first separation threshold THD. The lane departure warning system 9 is configured to output the lane departure signal SLD when the determined lateral separation DLAT is less than or equal to the first separation threshold THD. The first separation threshold THD may, for example, be defined as 20 cm, 30 cm or 50 cm.

Alternatively, or in addition, the lane departure warning system 9 may determine a rate of change of the lateral separation DLAT to assess lateral movement of the host vehicle 2 within the host-vehicle lane of travel LT-n. The rate of change may, for example, facilitate prediction of when the host vehicle 2 is likely to depart the host-vehicle lane of travel LT-n. The rate of change may be compared to a predefined threshold. If the determined rate of change is greater than the predefined threshold, the lane departure warning system 9 may predict that the host vehicle 2 will depart the host-vehicle lane of travel LT-n. The lane departure warning system 9 may generate the lane departure signal SLD if these conditions are identified irrespective of the determined lateral separation DLAT. The lane departure warning system 9 may be configured to inhibit output of the lane departure signal SLD, for example if the driver activates the directional (side) indicators.

The control system 1 is configured to generate a steering overlay signal SOV in dependence on the lane departure signal SLD. The steering overlay signal SOV is output to the power assist steering system 6 to control generation of the steering overlay. As described herein, the steering overlay in the present embodiment comprises a lane assist steering overlay STQ-LD. The lane assist steering overlay STQ-LD in the present embodiment comprises or consists of a lane assist steering torque STQ-LD. The lane assist steering torque STQ-LD is applied as a steering wheel torque overlay to the steering assist torque STQ-PA generated by the power assist steering system 6. The steering torque request may comprise a torque request direction (+ve or −ve) and optionally also a torque request magnitude. In a variant, the power assist steering system 6 may utilize steering angle to control the host vehicle 2. As described herein, the control system 1 is configured to control generation of the steering overlay signal SOV in dependence on one or more dynamic operating parameter of the host vehicle 2. The control system 1 thereby controls generation of the lane assist steering torque STQ-LD. The one or more dynamic operating parameter may relate to the movement of the host vehicle 2 within the host-vehicle lane of travel LT-n, such as the lateral movement of the host vehicle 2 relative to one or more lateral boundaries of the lane of travel LT-n. In the present embodiment, the generation of the steering overlay signal SOV is controlled in dependence on the determined lateral velocity VLAT of the host vehicle 2.

The control system 1 determines the lateral velocity VLAT of the host vehicle 2 along the transverse axis Y. The lateral velocity VLAT is determined in dependence on a reference velocity VREF and a slip angle of the host vehicle 2. The reference velocity VREF of the host vehicle 2 is calculated in dependence on the rotational speed of one or more wheels W1-4 of the host vehicle 2. A wheel speed sensor 12-*n* is associated with each wheel W1-4 and outputs a wheel speed signal to the control system 1. The reference velocity VREF is calculated in dependence on the wheel speed signals and output to the control system 1. Alternatively, or in addition, the reference velocity VREF may be modeled in dependence on the measured longitudinal acceleration of the host vehicle 2. Alternatively, or in addition, the reference velocity VREF may be determined in dependence on a satellite navigation system, such as a global positioning system (GPS).

The slip angle of the host vehicle 2 is determined by an Inertial Measurement Unit (IMU) 12. The slip angle is the angle between the longitudinal axis X and the actual direction of travel of the host vehicle 2. The IMU 13 measures acceleration of the host vehicle 2 with reference to at least one axis. The IMU 13 in the present embodiment is a three-axis IMU 13. The IMU 13 comprises a three-axis accelerometer (not shown). The IMU 13 is operable to measure acceleration of the host vehicle 2 along one or more of the longitudinal axis X, the transverse axis Y and the vertical axis Z. The IMU 13 also measures acceleration of the host vehicle 2 about one or more of the longitudinal axis X, the transverse axis Y and the vertical axis Z. In a variant, the IMU 13 may be a two-axis IMU 13, for example comprising a two-axis accelerometer. The IMU 13 may optionally comprise a gyroscope. The IMU 13 measures lateral acceleration (acceleration along the transverse axis Y) and angular acceleration about the vertical axis Z (yaw rotation) and determines the slip angle of the host vehicle 2.

The control system 1 determines the lateral velocity VLAT of the host vehicle 2 in dependence on the reference velocity VREF and the slip angle. The control system 1 compares the lateral velocity VLAT of the host vehicle 2 to a predefined first lateral velocity threshold THV. The first lateral velocity threshold THV is stored in the system memory and is accessible by the control system 1. The first lateral velocity threshold THV is set as 0.1 m/s in the present embodiment. However, it will be understood that the first lateral velocity threshold THV can be calibrated to a higher value or a lower value. For example, the first lateral velocity threshold THV could be defined as 0.05 m/s, 0.2 m/s, or 0.3 m/s. When the determined lateral velocity VLAT is greater than or equal to the first lateral velocity threshold THV, the control system 1 is configured to enable (i.e. to permit or allow) generation of the steering overlay signal SOV which instructs the power assist steering actuator 6 to generate the lane assist steering torque STQ-LD. When the determined lateral velocity VLAT is less than the first lateral velocity threshold THV, the control system 1 is configured to inhibit (i.e. to suppress or otherwise prevent) generation of the steering overlay signal SOV comprising the lane assist steering torque STQ-LD or the road edge assist steering torque STQ-RE. In a variant, the first lateral velocity threshold THV could be dynamic. For example, the first lateral velocity threshold THV could be modified in dependence on the determined lateral separation DLAT. The first lateral velocity threshold THV could increase and decrease in direct proportion to the determined lateral separation DLAT. Alternatively, a plurality of lateral velocity thresholds THV may be defined. The lateral velocity threshold THV may be selected in dependence on the determined lateral separation DLAT.

Alternatively, or in addition, the generation of the steering overlay signal SOV may be controlled in dependence on the determined lateral acceleration of the host vehicle 2. In a further variant, the generation of the steering overlay signal SOV may be controlled in dependence on a determined lateral movement of the host vehicle 2 relative to one of the lateral boundaries (BD-n) of the host-vehicle lane of travel LT-n or a principal axis of the host-vehicle lane of travel LT-n. In a further variant, the generation of the steering overlay signal SOV may be controlled in dependence on a determined rate of change of the determined lateral separation DLAT between the host vehicle 2 and a lateral boundary BD-n.

The control system 1 can be implemented when the host vehicle 2 is traveling on a road R having one or more lanes of travel LT-n. By way of example, a first road section R-A is shown in FIG. 2A; and a second road section R-B is shown in FIG. 2B. The first and second road sections R-A, R-B can form part of the same road R or may be separate roads R. The first road section R-A is a two-lane road (also known as a "two-lane highway") having first and second lanes of travel LT-1, LT-2 for vehicles traveling in respective first and second directions. The second road section R-B consists of a multiple-lane road (also known as a "multiple-lane highway") having two or more lanes of travel LT-n for vehicles traveling in the same direction. It will be understood that the present invention is not limited to operation on roads having the features illustrated in the first and second road sections R-A, R-B. The first and second road sections R-A, R-B each comprise first and second road edges RE-1, RE-2. In the illustrated example, the first and second road edges RE-1, RE-2 mark the lateral extent of the metaled road surface. It will be understood that one or both of the first and second road edges RE-1, RE-2 may comprise a barrier or partition member, for example separating lanes of a dual carriageway (also known as a "divided highway"). The first and second road sections R-A, R-B may also comprise road markings (denoted herein generally by the reference numeral 14). The first road section R-A has road markings 14 comprising a central road marking 15. As shown in FIG. 2B, the central road marking 15 comprise a centre line of the second road section R-B. The road markings 14 on the second road section R-B comprise one or more lane markings 16-*n* representing a lateral boundary BD-n of a lane of travel LT-n for vehicles traveling in the same direction or in opposite directions. The one or more lane markings 16-*n* may comprise lane lines. In the illustrated arrangement, the second road section R-B comprises first and second lane markings 16-1, 16-2 for demarcating first, second and third lanes of travel LT-1, LT-2, LT-3. The central road marking 15 and/or the one or more lane marking(s) 16-*n* may each comprise a continuous line (not shown) or an interrupted line (shown in FIGS. 3A and 3B). The road marking(s) 14 may each comprise one line or multiple lines, for example in the form of a single line or a double line. The central road marking 15 typically differentiates between sections of the first or second road section R-A, R-B intended for travel in opposite directions. Alternatively, or in addition, the road marking(s) 14 may comprise edge lines to indicate an edge of an inboard lane; the edge lines may be separated from the associated first or second road edge RE-1, RE-2. The second road section R-B shown in FIG. 3B comprises central road markings 15 and lane markings 16 defining a plurality of lanes of travel LT-n.

The host vehicle 2 is illustrated in FIG. 2A traveling within a first lane of travel LT-1. The host-vehicle lane of travel LT-1 has a first lateral boundary BD-1 defined by the first road edge RE-1; and a second lateral boundary BD-2 defined by the central road marking 15. The host vehicle 2 is illustrated in FIG. 2B traveling within a second lane of travel LT-2. The host-vehicle lane of travel LT-2 has a first lateral boundary BD-1 defined by the first lane marking 16-1; and a second lateral boundary BD-1 defined by the second lane marking 16-2. Other combinations of the first and second lateral boundaries BD-1, BD-2 of the host-vehicle lane of travel LT-n are contemplated. For example, the host-vehicle lane of travel LT-n may have a first lateral boundary BD-1 comprising a lane marking 16-$n$; and a second lateral boundary BD-1 comprising a central road marking 15 or a first road edge RE-1. In a further example, the host-vehicle lane of travel LT-n may have a first lateral boundary BD-1 comprising a first road edge RE-1; and a second lateral boundary BD-1 comprising a second road edge RE-2.

Figure 3A:
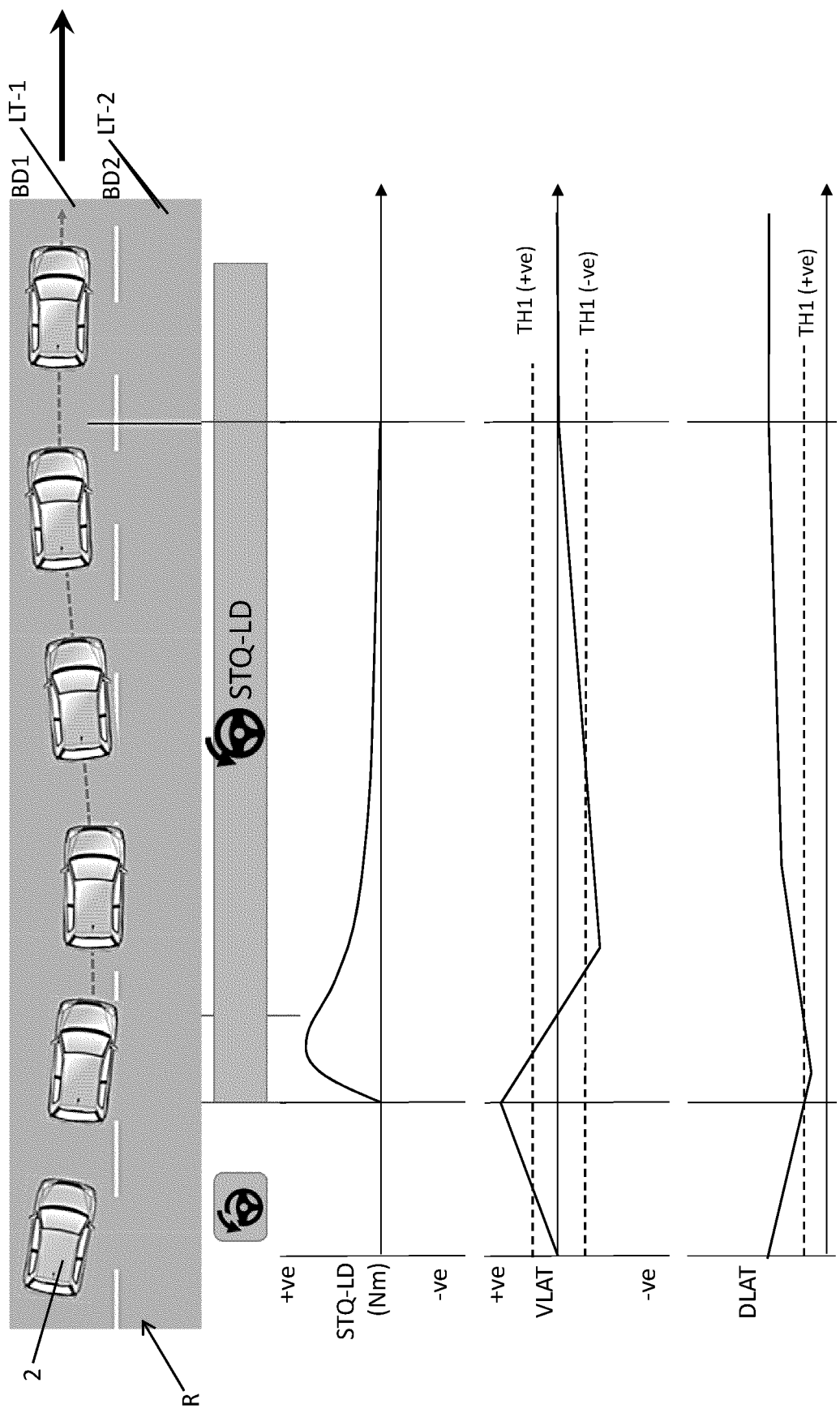
FIG. 3A illustrates the operation of the control system to enable generation of a lane keep assist torque in a first operating scenario.
Figure 3B:
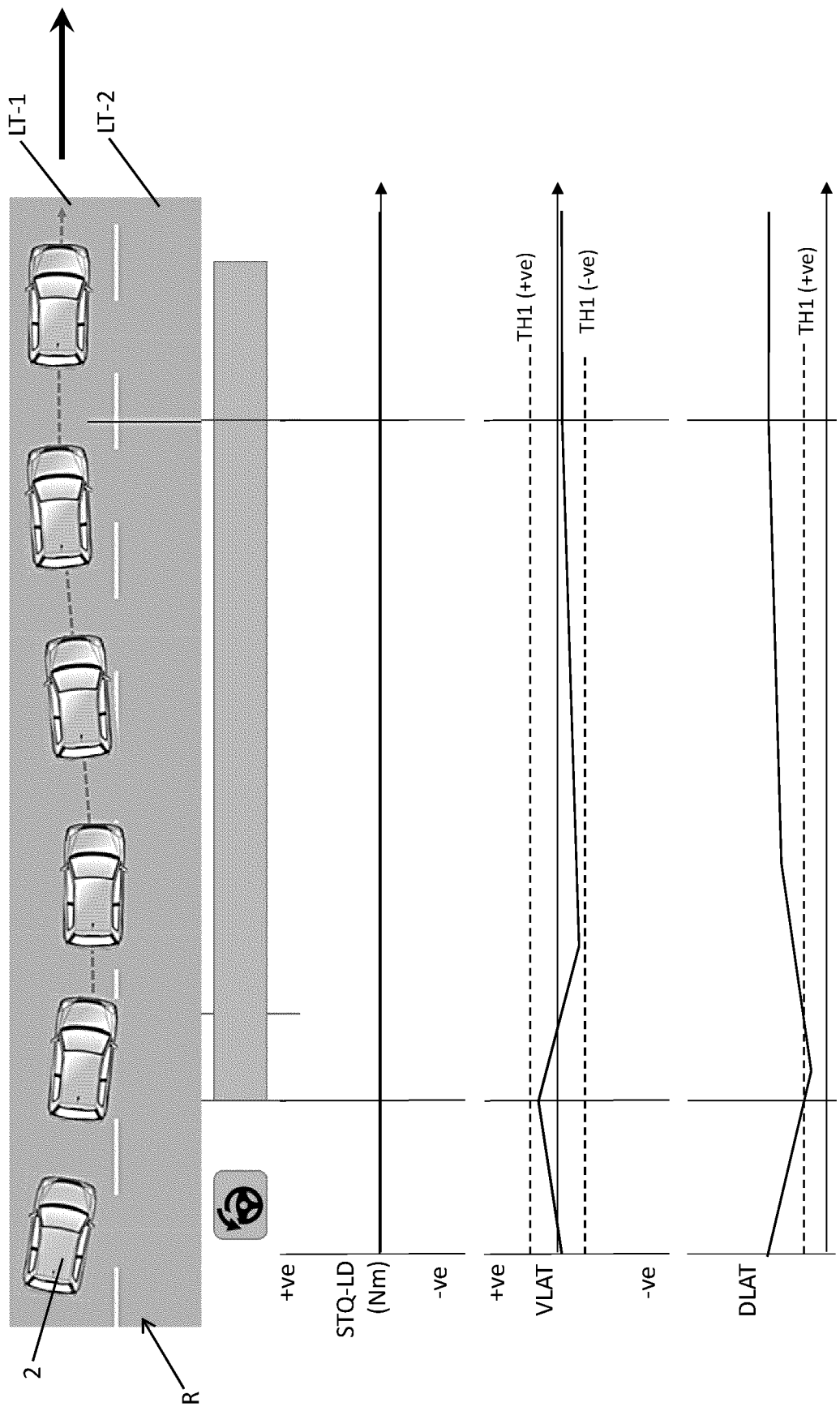
FIG. 3B illustrates the operation of the control system to inhibit generation of a lane keep assist torque in a second operating scenario.
Figure 4:
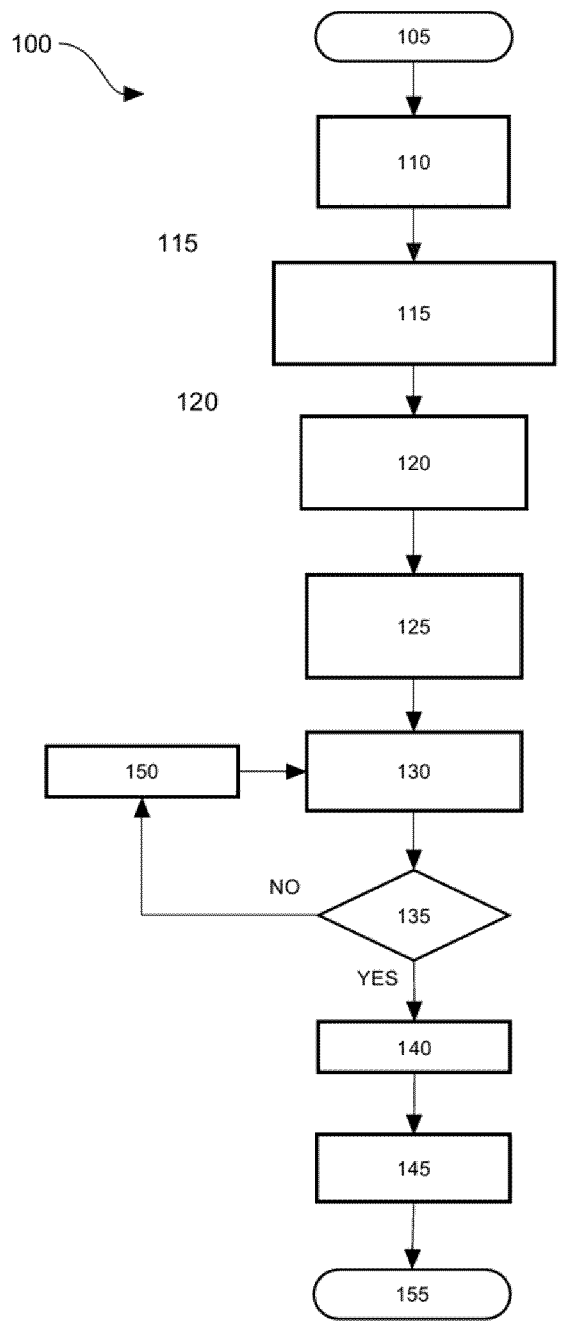
FIG. 4 is a first block diagram showing operation of the control system to control a trajectory of the host vehicle in dependence on lateral velocity of the host vehicle.

If the lateral separation DLAT between the host vehicle 2 and one of the first and second lateral boundaries BD-1, BD-2 is less than or equal to the separation threshold THD, the lane departure warning system 9 determines that the host vehicle 2 is departing the host-vehicle lane of travel LT-n. The lane departure warning system 9 then outputs the lane departure signal SLD to the control system 1. The lane departure signal SLD includes an indication of whether the host vehicle 2 is traversing one of the first and second lateral boundaries BD-1, BD-2 on a right-hand side or a left-hand side of the host vehicle 2. The control system 1 compares the lateral velocity VLAT of the host vehicle 2 to the first lateral velocity threshold THV. If the determined lateral velocity VLAT is greater than or equal to the first lateral velocity threshold THV, the control system 1 outputs the steering overlay signal SOV to the power assist steering actuator 6. As shown in FIG. 3A, the power assist steering actuator 6 generates the lane assist steering torque STQ-LD to counter the movement of the host vehicle 2 out of the host-vehicle late of travel LT-n. The lane assist steering torque STQ-LD is applied as a steering wheel torque overlay to the steering assist torque STQ-PA generated by the power assist steering system 6. The lane assist steering torque STQ-LD is transmitted to the steering wheel 5 to provide a haptic signal to the driver of the host vehicle 2. The lane assist steering torque STQ-LD is output to the steering wheel 5 in an appropriate direction to maintain the host vehicle 2 in the host-vehicle lane of travel LT-n. The magnitude of the lane assist steering torque STQ-LD is controlled such that, if necessary, the driver can override the lane assist steering torque STQ-LD, for example to implement a change in trajectory of the host vehicle 2 to implement a planned change in the lane of travel LT-n. The lane assist steering torque STQ-LD may, for example, have a maximum value of 3 Nm. If the determined lateral velocity VLAT is less than the first lateral velocity threshold THV, the control system 1 inhibits generation of the steering overlay signal SOV. As shown in FIG. 3B, the power assist steering actuator 6 does not generate the lane assist steering torque STQ-LD. In this scenario, the lateral velocity VLAT is below the lateral velocity threshold THV and the driver applies an appropriate steering torque to the steering wheel 5 to maintain the host vehicle 2 in the host-vehicle lane of travel LT-n. It will be understood that the control system 1 will output the steering overlay signal SOV to the power assist steering actuator 6.

A first block diagram 100 representing operation of the control system 1 is shown in FIG. The control system 1 is activated (BLOCK 105). The image processing module 11 processes the image data captured by the sensors (BLOCK 110). One or more lateral boundary of the host-vehicle lane of travel LT-n are identified (BLOCK 115). The lane departure warning system 9 monitors the intra-lane position of the host vehicle 2 relative to an identified lateral boundary (BLOCK 120). If the lateral separation between the host vehicle 2 and the lateral boundary is less than or equal to a predefined separation threshold THD, the lane departure warning system 9 determines that the host vehicle 2 is leaving the host-vehicle lane of travel LT-n and outputs a lane departure signal SLD (BLOCK 125). The control system 1 determines the lateral velocity VLAT of the host vehicle 2 within the host-vehicle lane of travel LT-n (BLOCK 130). The lateral velocity VLAT is compared to the predefined lateral velocity threshold THV (BLOCK 135). If the lateral velocity VLAT is greater than or equal to the first lateral velocity threshold THV, the control system 1 outputs the steering overlay signal SOV to the power assist steering actuator 6 (BLOCK 140). The power assist steering actuator 6 applies the lane assist steering torque STQ-LA as a steering torque overlay (BLOCK 145). If the lateral velocity VLAT is less than the first lateral velocity threshold THV, the control system 1 inhibits output of the steering overlay signal SOV to the power assist steering actuator 6 (BLOCK 150). The control system 1 continues to monitor the lateral velocity VLAT of the host vehicle 2. The process is performed continuously while the host vehicle 2 is traveling within the host-vehicle lane of travel LT-n. The control system 1 is deactivated when the host vehicle 2 comes to a halt and the ignition is switched off (BLOCK 155).

The control system 1 may be configured to apply a lateral velocity hysteresis to take account of changes in the lateral velocity VLAT of the host vehicle 2. For example, a lateral velocity hysteresis value may be defined as 0.05 m/s.

In a variant of the present embodiment, the control system 1 is configured to operate in conjunction with a blind spot assist system 26. The blind spot assist system 26 may be configured to detect another vehicle 27 traveling in a driver blind spot, for example in a rear three-quarter position (on a nearside or an offside) of the host vehicle 2. The host vehicle 2 and the vehicle 27 may be traveling in adjacent lanes of travel LT-n. The blind spot assist system 26 comprises one or more sensors 28 arranged to establish a blind spot detection area 29 (represented by hashed lines in FIG. 2B). The sensor(s) 28 may comprise imaging sensors 30, for example comprising one or more optical camera, a radar system or a LIDAR system. The blind spot assist system 26 generates a vehicle detected signal SVD if a vehicle 27 is detected within the blind spot detection area 29. The vehicle detected signal SVD identifies the position of the vehicle 27 in relation to the host vehicle 2. The vehicle detected signal SVD is output to the control system 1. The control system 1 is configured to control generation of the steering overlay signal SOV in dependence on the vehicle detected signal SVD from the blind spot assist system 26 and the lane departure signal SLD from the lane departure warning system 9. The control system 1 determines if the departure from the host-vehicle lane of travel LT-n is in a direction towards or away from the vehicle 27 detected by the blind spot assist system 31. The control system 1 may operate irrespective of whether the driver of the host vehicle 2 has activated side indicators to signal the intended manoeuvre.

The control system 1 is configured to determine if the blind spot assist system 26 detects a vehicle 27 in the blind spot detection area 29; and the lane departure warning system 9 determines that the host vehicle is departing the host-vehicle lane of travel LT-n (in a direction towards the vehicle 27). If these conditions are identified, the control system 1 controls generation of the steering overlay signal SOV in dependence on the lateral velocity VLAT of the host vehicle 2. The control system 1 inhibits generation of the steering overlay signal SOV if the determined lateral velocity VLAT of the host vehicle 2 is less than the first lateral velocity threshold THV. The lane assist steering torque STQ-LA is not applied if the control system 1 determines that the lateral velocity VLAT of the host vehicle 2 is less than the first lateral velocity threshold THV. The control system 1 enables generation of the steering overlay signal SOV if the determined lateral velocity VLAT of the host vehicle 2 is greater than or equal to the first lateral velocity threshold THV. The steering overlay signal SOV is output to the power assist steering actuator 6 which generates a lane assist steering torque STQ-LD. The lane assist steering torque STQ-LD is applied as a steering wheel torque overlay to the steering assist torque STQ-PA generated by the power assist steering system 6. The lane assist steering torque STQ-LA is applied if the control system 1 determines that the lateral velocity VLAT of the host vehicle 2 is greater than or equal to the first lateral velocity threshold THV.

Figure 5:
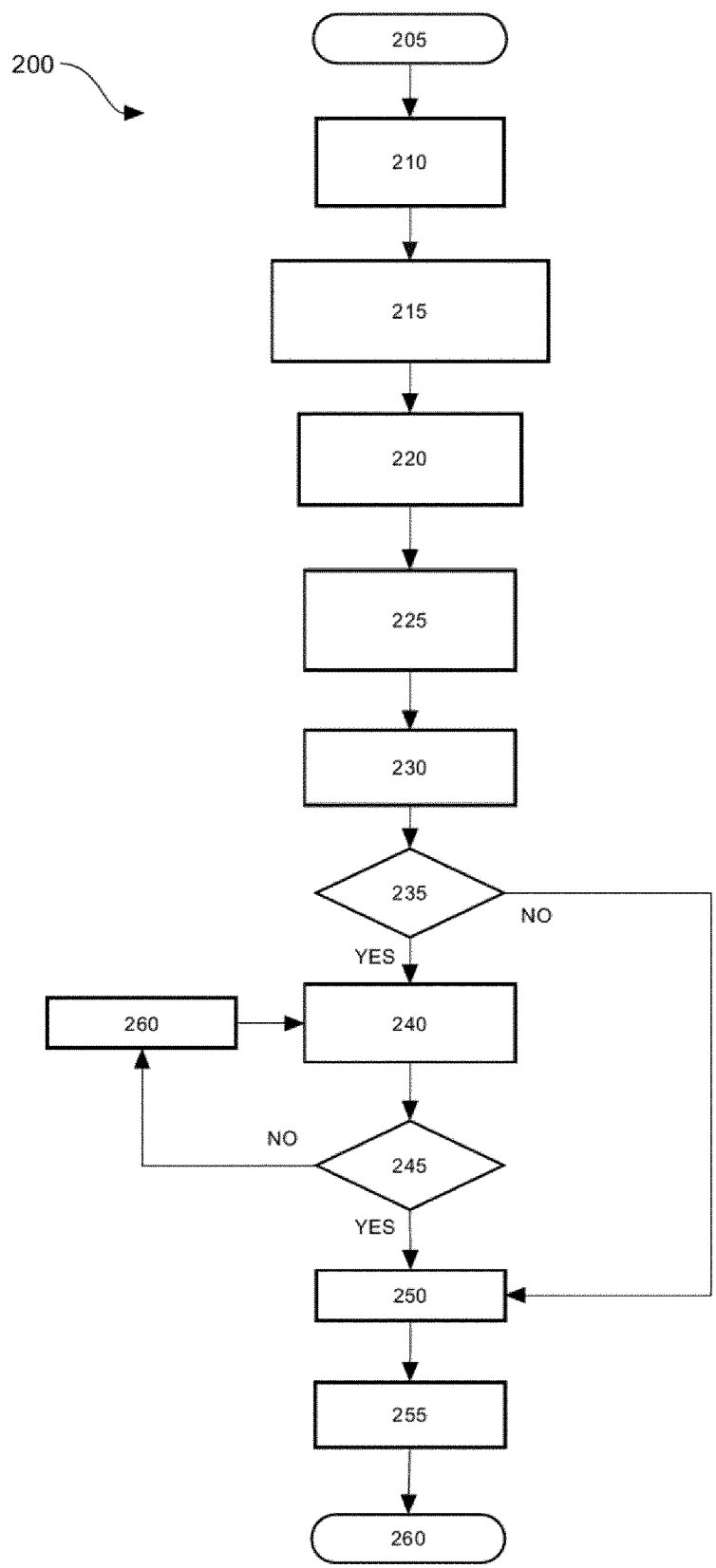
FIG. 5 is a second block diagram showing operation of the control system to control a trajectory of the host vehicle when another vehicle is detected.

A second block diagram 200 representing operation of the control system 1 in conjunction with the blind spot assist system 26 is shown in FIG. 5. The control system 1 is activated (BLOCK 205). The image processing module 11 processes the image data captured by the sensors (BLOCK 210). One or more lateral boundary of the host-vehicle lane of travel LT-n are identified (BLOCK 215). The lane departure warning system 9 monitors the intra-lane position of the host vehicle 2 relative to an identified lateral boundary (BLOCK 220). If the lateral separation between the host vehicle 2 and the lateral boundary is less than or equal to a predefined separation threshold THD, the lane departure warning system 9 determines that the host vehicle 2 is leaving the host-vehicle lane of travel LT-n and outputs a lane departure signal SLD (BLOCK 225). The blind spot assist system 26 monitors the blind spot detection area 29 to identify the presence or absence of a vehicle 27 in the blind spot detection area 29 on the side of the host vehicle 2 corresponding to the direction of travel of the host vehicle 2 (BLOCK 230). A check is performed to determine if a vehicle 27 is present in the blind spot detection area 29 (BLOCK 235). If the blind spot assist system 26 detects a vehicle 27 in the blind spot detection area 29, the control system 1 determines the lateral velocity VLAT of the host vehicle 2 (BLOCK 240). The lateral velocity VLAT is compared to the predefined lateral velocity threshold THV (BLOCK 245). If the lateral velocity VLAT is greater than or equal to the first lateral velocity threshold THV, the control system 1 outputs the steering overlay signal SOV to the power assist steering actuator 6 (BLOCK 250). If the blind spot assist system 26 does not detect a vehicle 27 in the blind spot detection area 29, the control system 1 outputs the steering overlay signal SOV without monitoring the lateral velocity VLAT of the host vehicle 2. The power assist steering actuator 6 applies the lane assist steering torque STQ-LA as a steering torque overlay (BLOCK 255). If the lateral velocity VLAT is less than the first lateral velocity threshold THV, the control system 1 inhibits output of the steering overlay signal SOV to the power assist steering actuator 6 (BLOCK 260). The control system 1 continues to monitor the lateral velocity VLAT of the host vehicle 2. The process is performed continuously while the host vehicle 2 is traveling within the host-vehicle lane of travel LT-n. The control system 1 is deactivated when the host vehicle 2 comes to a halt and the ignition is switched off (BLOCK 265).

The blind spot assist system 31 may optionally estimate a speed and/or a trajectory of the vehicle 27. The blind spot assist system 31 may thereby predict changes in the position of the vehicle 27 relative to the host vehicle 2.

Figure 6:
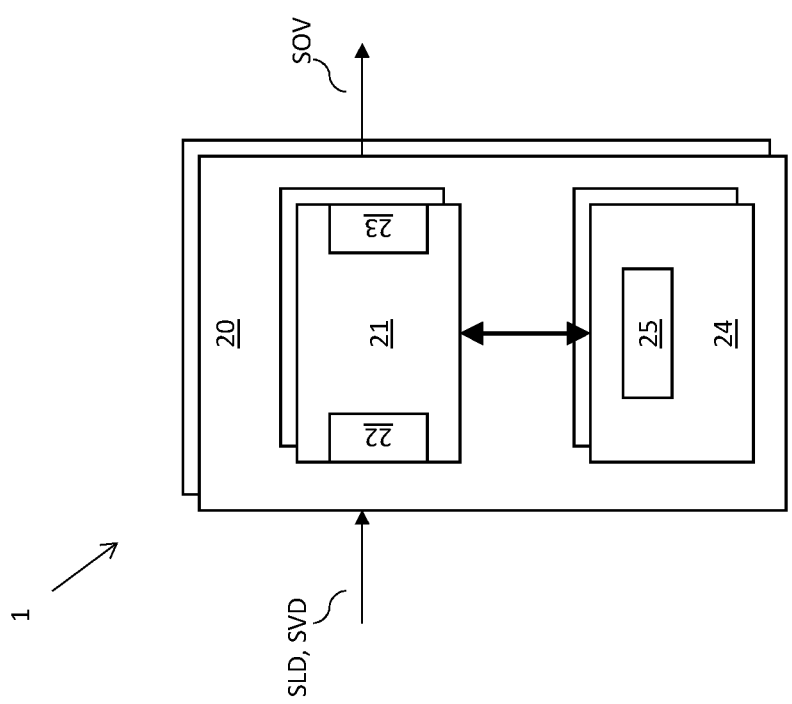
FIG. 6 shows a schematic representation of a controller for implementing the control system in accordance with an embodiment of the present invention.

With reference to FIG. 6, there is illustrated a simplified example of a control system 1 such as may be adapted to implement the method described herein. The control system 1 comprises one or more controllers 20 and is configured to control generation of the steering overlay signal to control a trajectory a of a host vehicle 2. The control system 1 includes one or more controllers 20 and is configured to determine the lateral velocity of the host vehicle 2. The control system 1 generates the steering overlay signal when the determined lateral velocity is greater than or equal to the first lateral velocity threshold THV. The control system 1 inhibits generation of the steering overlay signal SOV when the determined lateral velocity is less than the first lateral velocity threshold THV.

It is to be understood that the or each controller 20 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 20 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 20 to implement the control techniques described herein (including some or all of the functionality required for the method described herein). The set of instructions could be embedded in said one or more electronic processors of the controller 20; or alternatively, the set of instructions could be provided as software to be executed in the controller 20. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 6, the or each controller 20 comprises at least one electronic processor 21 having one or more electrical input(s) 22 for receiving one or more input signals, and one or more electrical output(s) 23 for outputting one or more output signals. The or each controller 20 further comprises at least one memory device 24 electrically coupled to the at least one electronic processor 21 and having instructions 25 stored therein. The at least one electronic processor 21 is configured to access the at least one memory device 24 and execute the instructions 25 thereon.

The, or each, electronic processor 21 may comprise any suitable electronic processor (e.g., a microprocessor, a microcontroller, an ASIC, etc.) that is configured to execute electronic instructions. The, or each, electronic memory device 24 may comprise any suitable memory device and may store a variety of data, information, threshold value(s), lookup tables or other data structures, and/or instructions therein or thereon. In an embodiment, the memory device 24 has information and instructions for software, firmware, programs, algorithms, scripts, applications, etc. stored therein or thereon that may govern all or part of the methodology described herein. The processor, or each, electronic processor 21 may access the memory device 24 and execute and/or use that or those instructions and information to carry out or perform some or all of the functionality and methodology describe herein.

The at least one memory device 24 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 20 have been described comprising at least one electronic processor 21 configured to execute electronic instructions stored within at least one memory device 24, which when executed causes the electronic processor(s) 21 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

A further embodiment of the control system 1 will now be described. Like reference numerals are used for like components. The description of the present embodiment focuses on the differences over the previous embodiment.

The control system 1 in accordance with the present embodiment is configured to control generation of the steering overlay signal SOV in dependence on the identification of an external object proximal to the host vehicle 2. The external object may, for example, be another vehicle 27. The host vehicle 2 and the vehicle 27 could be traveling in opposite directions on the road R. However, the present embodiment has particular application when the host vehicle 2 and the vehicle 27 are traveling in the same direction on the road R. The host vehicle 2 and the vehicle 27 may, for example, be traveling in adjacent lanes of travel LT-n. The vehicle 27 may be positioned in a blind spot of the driver of the host vehicle 2, for example in a rear three-quarter position (on a nearside or an offside of the host vehicle 2).

The host vehicle 2 comprises a blind spot assist system 31 configured to identify the presence or absence of the vehicle 27. The blind spot assist system 31 comprises one or more sensors arranged to establish a blind spot detection area 29. In the present embodiment the one or more sensors comprise imaging sensors, such as an optical camera, a radar system or a LIDAR system, which generate image data. An image processing module 11 is provided to analyze the image data to identify the vehicle 27 within the blind spot detection area 29. The image processing module 11 also determines a position of the vehicle 27 relative to the host vehicle 2. The blind spot assist system 31 determines a lateral separation DLAT between the host vehicle 2 and the vehicle 27. The lateral separation DLAT may be determined along the transverse axis Y of the host vehicle 3. Alternatively, or in addition, the lateral separation DLAT may be determined orthogonal to a lane boundary of the host-vehicle lane of travel LT-n, for example the lane boundary between the lanes of travel LT-n of the host vehicle 2 and the vehicle 27. The blind spot assist system 31 may optionally also determine a longitudinal separation between the host vehicle 2 and the vehicle 27. The image processing module 11 may optionally process the image data with respect to time in order to estimate a speed and/or a trajectory of the vehicle 27. The blind spot assist system 31 may thereby predict changes in the relative position of the vehicle 27.

If the lateral separation DLAT between the host vehicle 2 and the vehicle 27 is less than or equal to a separation threshold THD, the blind spot assist system 31 outputs a vehicle detected signal SVD to the control system 1. The control system 1 compares the lateral velocity VLAT of the host vehicle 2 to the first lateral velocity threshold THV. The control system 1 is configured to control generation of the steering overlay signal SOV in dependence on the comparison of the lateral velocity VLAT to the first lateral velocity threshold THV.

If the determined lateral velocity VLAT is greater than or equal to the first lateral velocity threshold THV, the control system 1 outputs the steering overlay signal SOV to the power assist steering actuator 6. The power assist steering actuator 6 generates a blind spot assist steering torque STQ-BS. The blind spot assist steering torque STQ-BS is applied as a steering wheel torque overlay to the steering assist torque STQ-PA generated by the power assist steering system 6. The blind spot assist steering torque STQ-BS is transmitted to the steering wheel 5 to provide a haptic signal to the driver of the host vehicle 2. The blind spot assist steering torque STQ-BS is output to the steering wheel 5 in an appropriate direction to adjust the trajectory of the host vehicle 2 to avoid the vehicle 27. The magnitude of the blind spot assist steering torque STQ-BS is controlled such that, if necessary, the driver can override the blind spot assist steering torque STQ-BS, for example to implement a change in trajectory of the host vehicle 2 to implement a planned change in the lane of travel LT-n. The blind spot assist steering torque STQ-BS may, for example, have a maximum value of 3Nm. If the determined lateral velocity VLAT is less than the first lateral velocity threshold THV, the control system 1 inhibits generation of the steering overlay signal SOV. As shown in FIG. 3B, the power assist steering actuator 6 does not generate the lane assist steering torque STQ-LD. In this scenario, the lateral velocity VLAT is below the lateral velocity threshold THV and the driver applies an appropriate steering torque to the steering wheel 5 to maintain the host vehicle 2 in the host-vehicle lane of travel LT-n.

It will be appreciated that various changes and modifications can be made to the present invention without departing from the scope of the present application. Rather than control generation of the steering overlay signal SOV in dependence on an absolute lateral velocity VLAT, the control system 1 could determine the lateral velocity of the host vehicle 2 relative to one of the first and second lane boundaries of the host-vehicle lane of travel LT-n. The steering overly signal SOV may thereby controlled in dependence on the lateral movement of the host vehicle 2 within the host-vehicle lane of travel LT-n.

The steering overlay signal SOV may be configured to generate a steering torque or a steering angle which is directly proportional to the lateral velocity of the host vehicle. If the lateral velocity is small, the steering overlay signal SOV may result in application of a small steering torque or a small steering angle. If the lateral velocity is large, the steering overlay signal SOV may result in application of a large steering torque or a large steering angle.

The steering wheel overlay signal has been described herein as comprising or consisting of a torque request, for example comprising a torque direction and a torque magnitude. In a variant, the steering wheel overlay signal may comprise a steering angle signal for controlling the power assist steering system 6 to provide a target steering angle.

The power assist steering system 6 may apply a steering torque overlay in dependence on the steering angle signal.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

Flow Chart Labels

| BLOCK | LABEL |
|---|---|
| 105 | Start |
| 110 | Process Image Data |
| 115 | Identify Lateral Boundary/Boundaries |
| 120 | Determine Intra-lane (Inter-lane) Position of Host Vehicle |
| 125 | Generate Lane Departure Signal |
| 130 | Determine Lateral Velocity (VLAT) |
| 135 | Determined Lateral Velocity (VLAT) >= Threshold Value? |
| 140 | YES: Output Steering Overlay Signal (SOV) |
| 145 | Generate Lane Assist Steering Torque (STQ-LA) |
| 150 | NO: Inhibit Steering Overlay Signal (SOV) |
| 155 | END |
| 205 | Start |
| 210 | Process Image Data |
| 215 | Identify Lateral Boundary/Boundaries |
| 220 | Determine Intra-lane (Inter-lane) Position of Host Vehicle |
| 225 | Generate Lane Departure Signal |
| 230 | Monitor Blind Spot |
| 235 | Vehicle Detected? |
| 240 | YES: Determine Lateral Velocity (VLAT) |
| 245 | Determined Lateral Velocity (VLAT) >= Threshold Value? |
| 250 | YES: Output Steering Overlay Signal (SOV) |
| 255 | Generate Lane Assist Steering Torque (STQ-LA) |
| 260 | NO: Inhibit Steering Overlay Signal (SOV) |
| 265 | END |

The invention claimed is:

1. A control system for controlling generation of a steering overlay signal to control a trajectory of a host vehicle, the control system comprising one or more controllers, the control system configured to:
    identify a lateral boundary of the host-vehicle lane of travel;
    monitor a position of the host vehicle in relation to the lateral boundary of the host-vehicle lane of travel;
    determine a lateral velocity of the host vehicle; and
    generate the steering overlay signal in dependence on a determination that the host vehicle is approaching or traversing the lateral boundary of the host-vehicle lane of travel and that the determined lateral velocity is greater than or equal to a first lateral velocity threshold.

2. The control system as claimed in claim 1, wherein the control system is configured to determine a lateral separation between the host vehicle and the lateral boundary of the host-vehicle lane of travel; the steering overlay signal being generated when the determined lateral separation is less than or equal to a separation threshold.

3. The control system as claimed in claim 1, wherein the control system is configured to identify a presence or absence of another vehicle proximal to the host vehicle, wherein the steering overlay signal is generated in dependence on identification of the presence of the other vehicle.

4. The control system as claimed in claim 1, wherein the steering overlay signal controls the trajectory of the host vehicle to maintain or increase the lateral separation.

5. The control system as claimed in claim 1, wherein the control system is configured to suppress generation of the steering overlay signal when the determined lateral velocity is less than the first lateral velocity threshold.

6. The control system as claimed in claim 1, wherein the first lateral velocity threshold is approximately 0.1 m/s.

7. The control system as claimed in claim 1, wherein the control system is configured to suppress generation of the steering overlay signal when the determined lateral velocity is greater than a second lateral velocity threshold.

8. The control system as claimed in claim 1, wherein the control system is configured to apply a lateral velocity hysteresis.

9. A vehicle comprising the control system as claimed in claim 1.

10. A method of controlling a trajectory of a host vehicle, the method comprising:
    identifying a lateral boundary of the host-vehicle lane of travel;
    monitoring a position of the host vehicle in relation to the lateral boundary of the host-vehicle lane of travel;
    determining a lateral velocity of the host vehicle; and
    controlling the trajectory of the host vehicle in dependence on a determination that the host vehicle is approaching or traversing the lateral boundary of the host-vehicle lane of travel and that the determined lateral velocity is greater than or equal to a first lateral velocity threshold.

11. The method as claimed in claim 10, further comprising determining a lateral separation between the host vehicle and the lateral boundary of the host-vehicle lane of travel; and controlling the trajectory of the host vehicle when the determined lateral separation is less than or equal to a separation threshold.

12. The method as claimed in claim 10, wherein the method comprises identifying a presence or absence of another vehicle proximal to the host vehicle; and controlling the trajectory of the host vehicle in dependence on identification of the presence of the other vehicle.

13. The method as claimed in claim 10, wherein controlling the trajectory of the host vehicle comprises maintaining or increasing the lateral separation.

14. The method as claimed in claim 10, further comprising controlling the trajectory of the host vehicle when the determined lateral velocity is less than the first lateral velocity threshold.

15. The method as claimed in claim 10, wherein the first lateral velocity threshold is approximately 0.1 m/s.

16. The method as claimed in claim 10, further comprising suppressing controlling the trajectory of the host vehicle when the determined lateral velocity is greater than a second lateral velocity threshold.

17. The method as claimed in claim 10, further comprising applying a lateral velocity hysteresis.

18. A computer software that, when executed, is arranged to perform the method according to claim 10.

* * * * *